Figure 1:
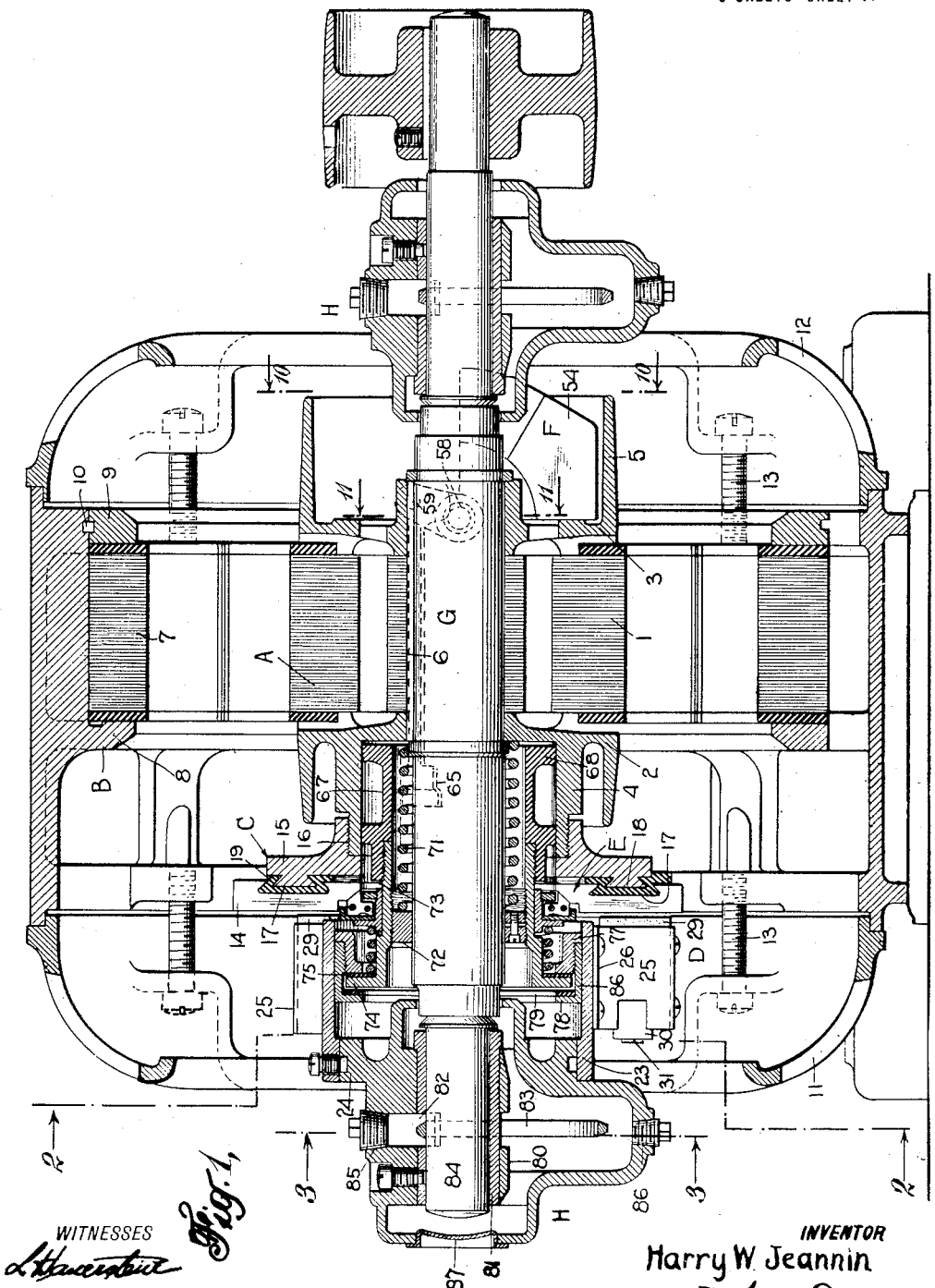

H. W. JEANNIN.
ALTERNATING CURRENT MOTOR.
APPLICATION FILED AUG. 24, 1915.

1,209,443.

Patented Dec. 19, 1916.
6 SHEETS—SHEET 2.

WITNESSES
L. Hauenstein
C. Bradway.

INVENTOR
Harry W. Jeannin
BY Munn & Co.
ATTORNEYS

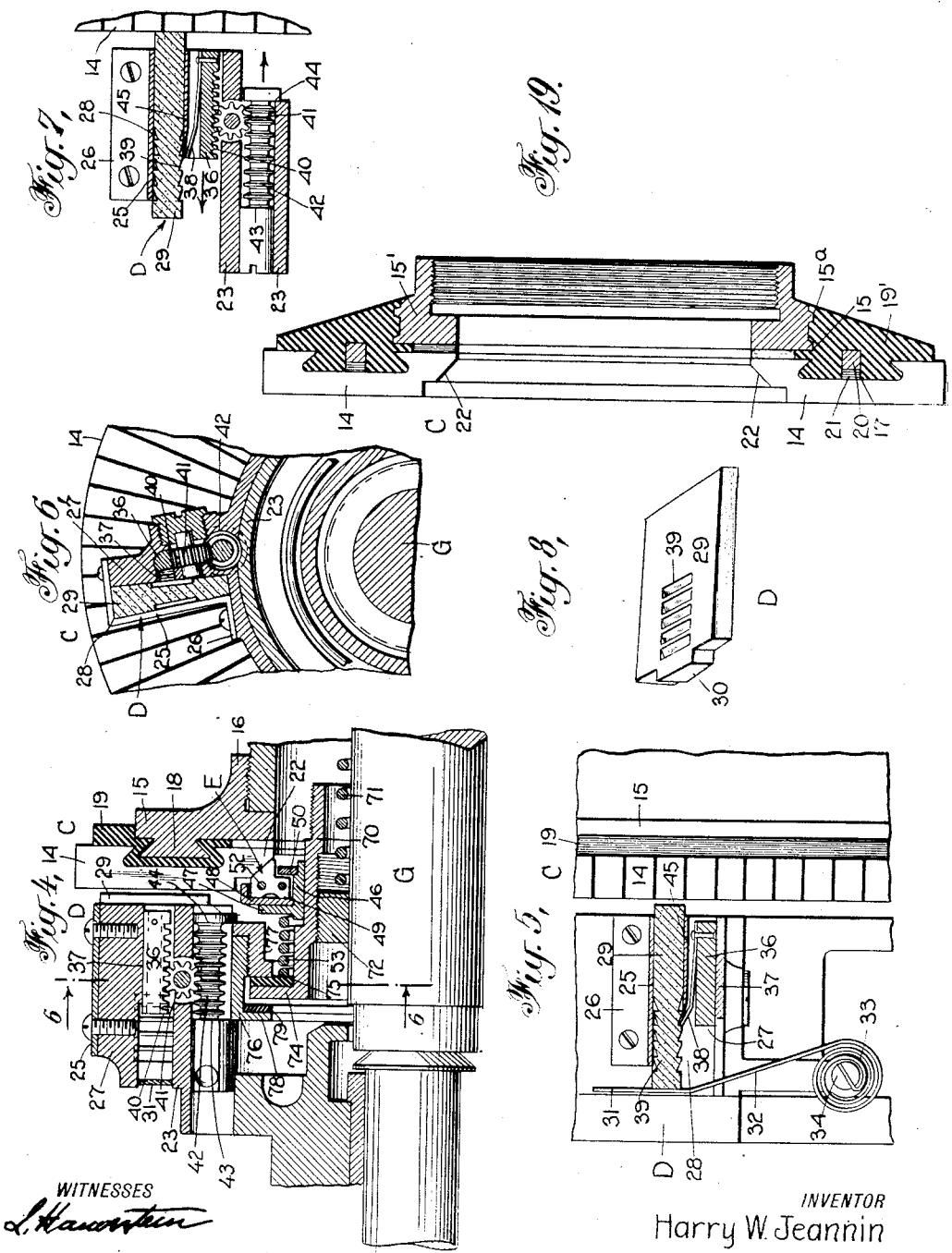

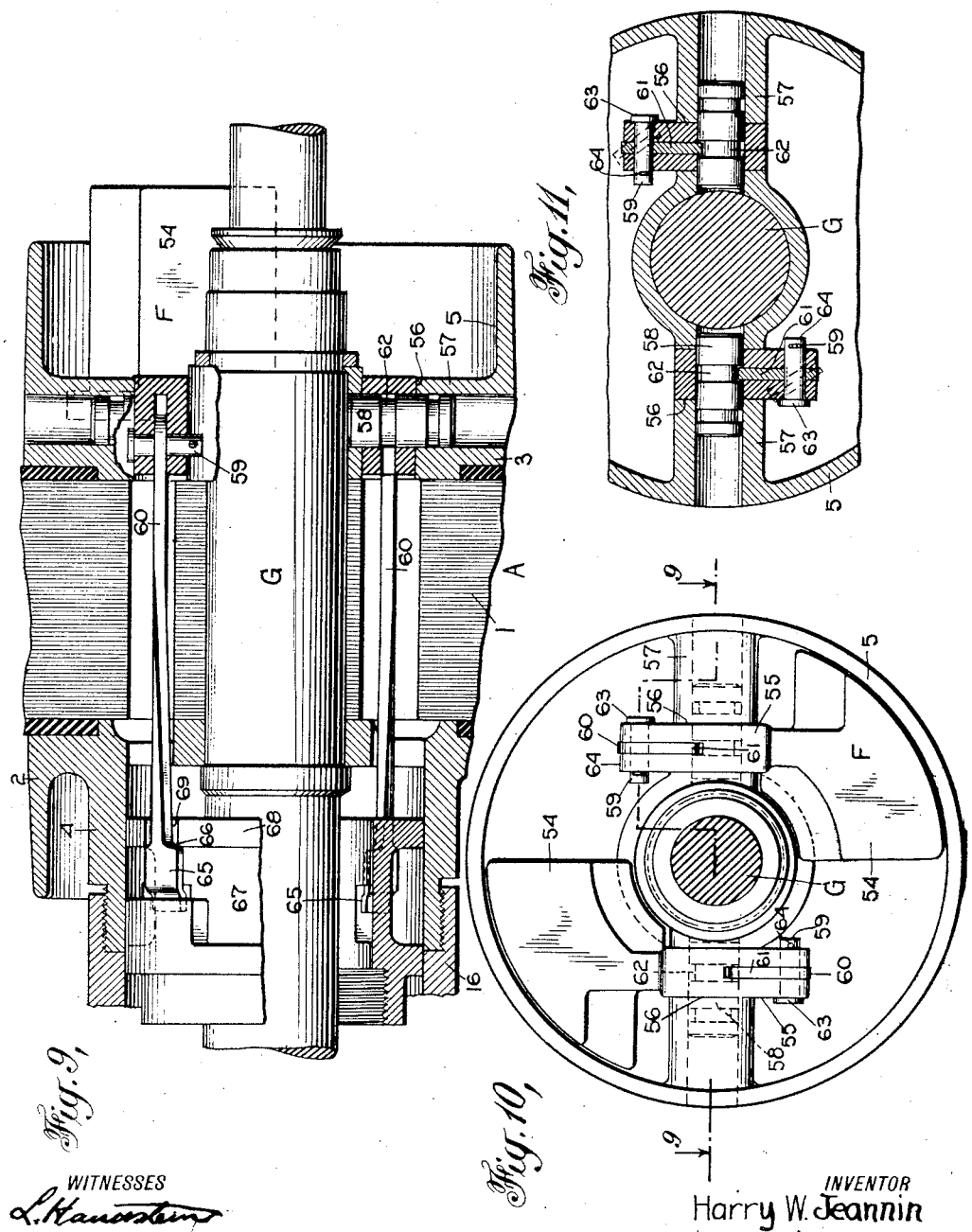

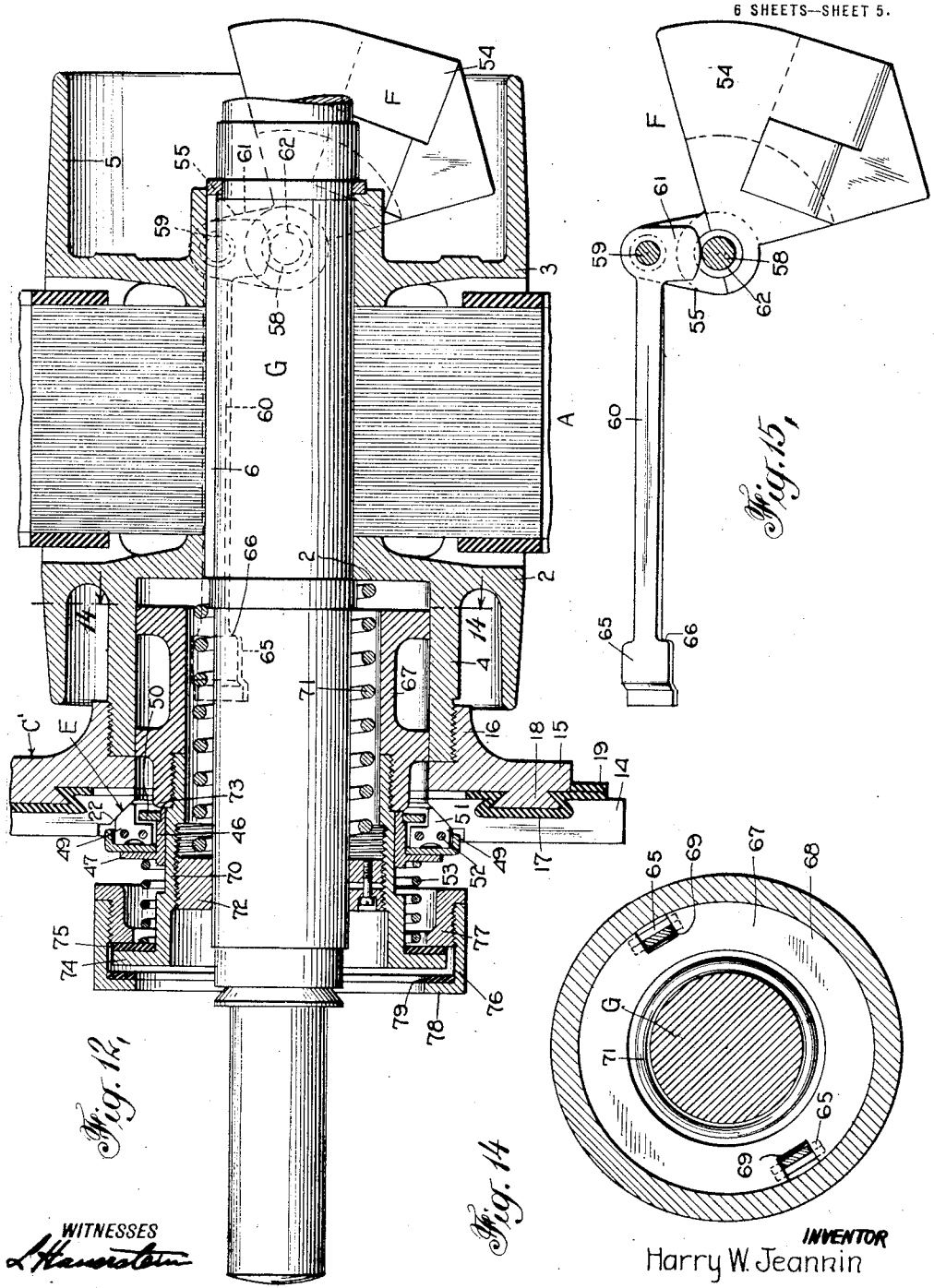

H. W. JEANNIN.
ALTERNATING CURRENT MOTOR.
APPLICATION FILED AUG. 24, 1915.

1,209,443.

Patented Dec. 19, 1916.
6 SHEETS—SHEET 6.

WITNESSES
L. Hauerstein
C. Bradway

INVENTOR
Harry W. Jeannin
BY Munn & Co.
ATTORNEYS

UNITED STATES PATENT OFFICE.

HARRY WALLACE JEANNIN, OF WARREN, OHIO.

ALTERNATING-CURRENT MOTOR.

1,209,443.  Specification of Letters Patent.  Patented Dec. 19, 1916.

Application filed August 24, 1915. Serial No. 47,040.

*To all whom it may concern:*

Be it known that I, HARRY W. JEANNIN, a citizen of the United States, and a resident of Warren, in the county of Trumbull and State of Ohio, have invented a new and Improved Alternating-Current Motor, of which the following is a full, clear, and exact description.

This invention relates to alternating electric current motors of the repulsion-induction motor type.

The invention has for its general objects to improve the construction and operation of apparatus of the character referred to which is reliable and effective in use, comparatively simple and inexpensive to manufacture and keep in operative condition, and so designed as to be of great efficiency in the conversion of electric into mechanical power.

A more specific object of the invention is the provision of an improved means for simultaneously short-circuiting the commutator and retracting the brushes therefrom so that the motor can be started by repulsion and continued after attainment of full speed by induction, this short-circuiting of the commutator and retraction of the brushes being accomplished by a centrifugal speed responsive device which is operatively connected with the short-circuit means through a spring or yielding medium, whereby a firm contact is maintained between the short-circuit means and commutator.

Another object of the invention is the provision of a simple, efficient and novel short-circuiting means whereby intimate contact is maintained with all the commutator bars and the engaging surfaces are kept effectively clean, this being due to the fact that the short circuiting means consists of a plurality of loosely arranged segments which are beveled to engage a beveled surface of the commutator so that, as the short-circuiting means is moved axially of the commutator, a sliding engagement is produced between the segments of the short-circuiting means and the commutator segments as the short-circuiting segments wedge into the commutator by the action of the speed responsive device.

An additional object is the employment of a novel means for causing the brushes to be retracted by the movement of the short-circuiting carrying element axially of the motor shaft in the direction toward the commutator, the brushes being retracted in the opposite direction.

Another object is to provide a commutator in which the segments are applied to the supporting ring by a dove-tailed rib on the latter which is bound to the commutator segments by an insulating material which is plastic under heat and which is extremely hard and durable under normal temperature, so that the commutator bars and supporting ring are integrally connected as one piece.

The invention has as a further object the provision of a bearing housing for the shaft in which the oiling ring is cast directly in the housing by being arranged in a casting core so that the usual slot at the top of the bearing housing for the insertion of the oiling ring is dispensed with, and thereby danger of oil splashing out is overcome.

With such objects in view, and others which will appear as the description proceeds, the invention comprises various novel features of construction and arrangement of parts which will be set forth with particularity in the following description and claims appended hereto.

Figure 2:
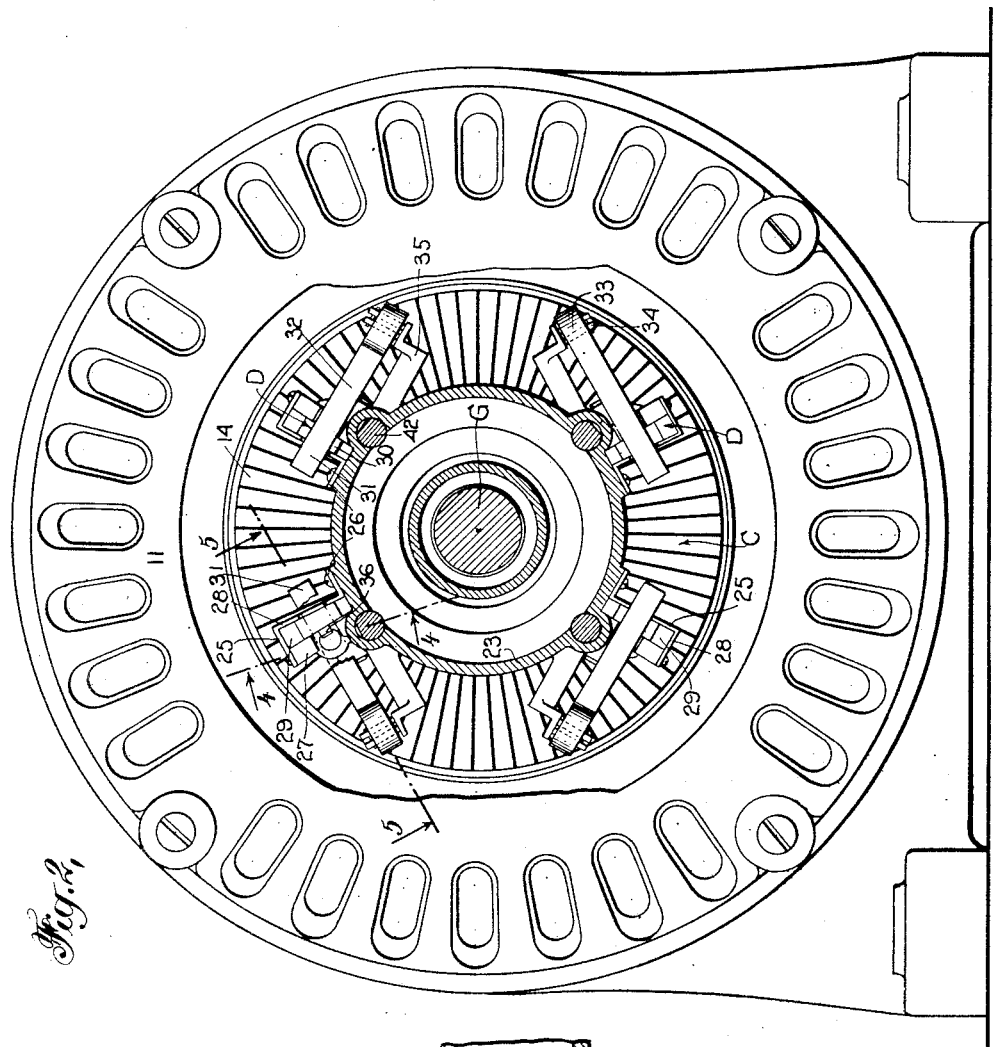
Figure 3:
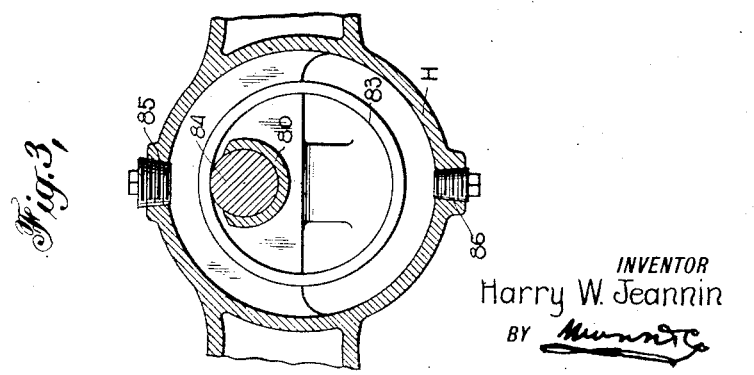
Figure 16:
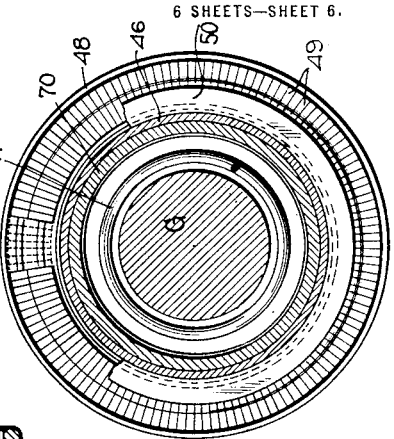
Figure 13:
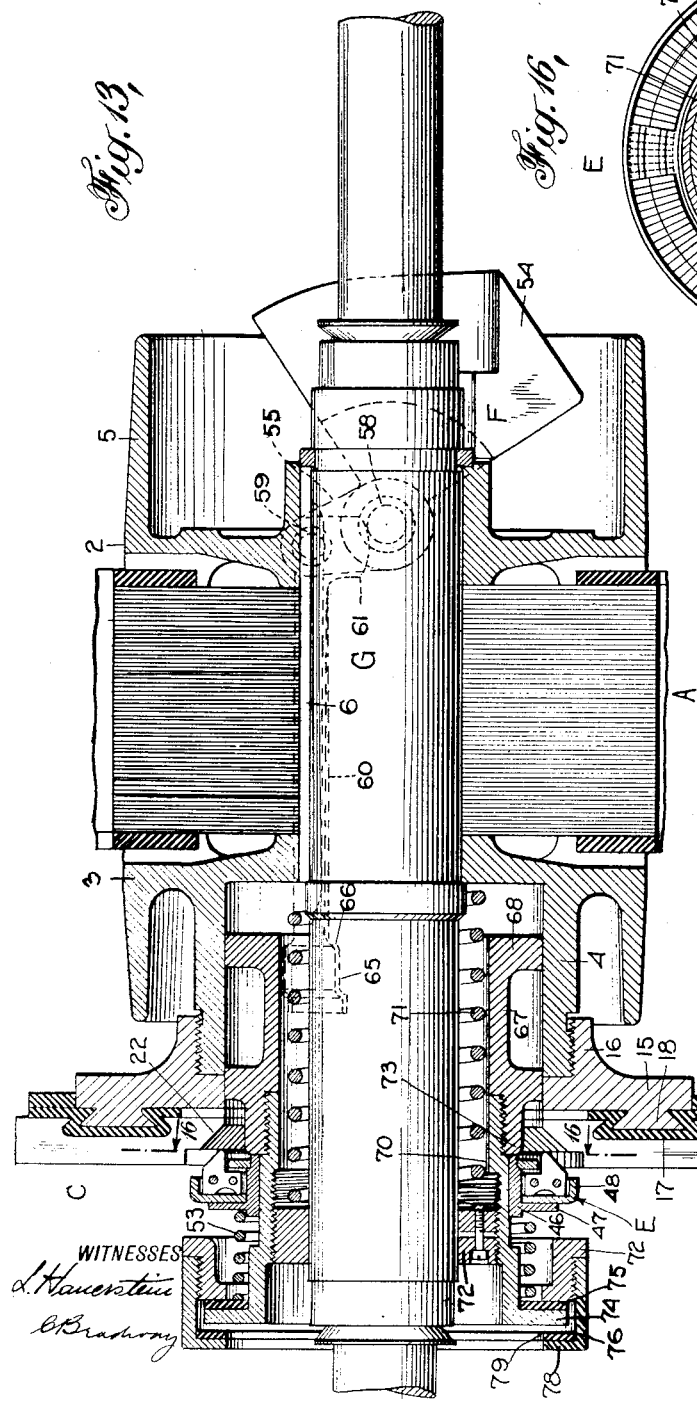
Figure 17:
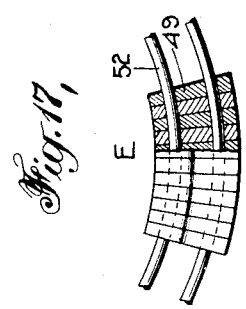
Figure 18:
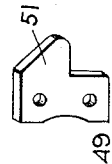

In the accompanying drawings, which illustrate one embodiment of the invention and wherein similar characters of reference indicate corresponding parts in all the views, Figure 1 is a longitudinal vertical section of the electric motor, showing the short-circuiting device in the position it occupies under normal speed conditions while the machine is operating as an induction motor; Fig. 2 is an end view with a portion of the head or end plate broken away and the brush rocker and associated parts being shown in section on the line 2—2, Fig. 1; Fig. 3 is a transverse section of one of the shaft bearings taken on the line 3—3, Fig. 1; Fig. 4 is an enlarged sectional view taken parallel with the axis of the shaft and in a plane to illustrate the brush actuating means and the short-circuiting device, the section being taken on the line 4—4, Fig. 2; Fig. 5 is a detail sectional view on the line 5—5, Fig. 2, to show the brush arrangement; Fig. 6 is a sectional view on the line 6—6, Fig. 4; Fig. 7 is a diagrammatic view showing the operative relation of the brush retracting means; Fig. 8 is a perspective view of one of the brushes; Fig. 9 is a horizontal sectional view showing the parts of the centrifugal speed responsive device and its relation to the armature, the section being taken on the line 9—9, Fig. 10; Fig. 10 is a transverse section on the line 9—9, Fig. 1, to show the weights of the governor; Fig. 11 is a detail sectional view on the line 11—11, Fig. 1, to show the connections between the governor weights and the links actuated thereby; Fig. 12 is a vertical section with a short circuiting device just making contact with the commutator; Fig. 13 is a similar view showing the short circuiting device in open circuit position, as when the armature is idle; Fig. 14 is a detail sectional view on the line 14—14, Fig. 12, to show the manner of connecting the governor links with the spring barrel guide; Fig. 15 is a side view of one of the governor weights and links connected therewith; Fig. 16 is a detail section on the line 16—16, Fig. 13, showing the short circuiting device; Fig. 17 is a detail view of some of the segments of the short circuiting device; Fig. 18 is a perspective view of one of the short circuiting segments; and Fig. 19 is a sectional view of a modified form of commutator.

Referring to the drawing, A designates the armature of the motor, B the field, C the commutator, D the brushes, E the short circuiting device, F the governor, G the motor shaft and H the shaft bearings.

The armature may be of usual construction, and embodies laminations 1 clamped between plates 2 and 3, the former of which has a cylindrical concentric flange or chambered hub 4 which forms a housing for the governor spring and associated parts, and the other plate 3 has a cylindrical concentric flange 5 that houses the weights of the governor. The armature is fastened to the shaft by a key 6. The laminations 7 of the field are clamped between an internal annular flange 8 on the field frame B and a ring 9 which is fastened to the frame by a key 10. The front and rear heads or plates 11 and 12 are fastened to the field frame by bolts or equivalent means 13, the bearings H being supported on the front and rear plates in the usual manner.

The commutator C is composed of radial segments 14 which are mounted on a ring or carrier 15 that has an internally threaded hub 16 which screws on the cylindrical flange or hub 4 of the armature. The commutator segments are anchored on the carrier 15 in a special manner, the inner or rear edges of the commutator being provided with dove-tailed recesses 17, and registering with these recesses of the circle of commutator segments is an annular dove-tailed rib 18 on the juxtaposed face of the carrier 15. The commutator segments are mounted on a suitable support in their proper relation, and a suitable material that is plastic when hot, such as bakelite or condensite 19, is filled into the groove formed by the recesses 17, and then the dove-tailed rib 18 of the carrier 15 is forced into this plastic material so that the commutator segments or bars will be rigidly anchored on the carrier and insulated therefrom, the adjacent bars being of course insulated from each other by the same kind or other insulating material. If desired, the commutator can be constructed as shown in Fig. 19, wherein the carrier or supporting ring 15' is of such diameter that the annular dove-tailed groove formed by the recesses 17' of the commutator bars 14' will lie beyond the periphery of the ring 15', which latter has circumferential anchoring ribs 15ª, and bakelite or condensite 19' binds this ribbed periphery of the ring 15' to the commutator bars by the said material entering the recesses of the latter. To provide for extra stresses that may be caused by excessive high speed, a steel ring 20 may be embedded in the insulating material 19', which ring is spaced from the commutator bars by a fiber insulating ring 21 interposed between the bars and the ring 20. The inner ends of the commutator bars have beveled surfaces 22 so that there will be an annular chamfer around the inner circle of the commutator for engagement by the short-circuiting device E.

The brush construction D will be understood by reference to Figs. 1, 2 and 4 to 8 inclusive. The rocker is in the form of a cylinder 23 carried by the front bearing H, which has an annular bearing 24 on which the rocker has a limited rotary movement. In the present instance four brushes are shown, and each is fastened to the rocker by a bracket or brush-holding gib 25. Each gib is of Z-shaped cross-section having its base 26 fastened to the rocker 23. The outer end of each gib is fastened to a radial projection 27 on the rocker, which projection coöperates with the gib to form a recess or pocket 28 in which is a brush 29 slidable toward and from the commutator in a line parallel with the axis of rotation. The brushes, as shown in Figs. 2 and 8, taper inwardly to correspond with the shape of the commutator segments, and the wider ends are formed with lugs 30 with which engage the free ends 31 of leaf springs 32, said springs having coiled portions 33 fastened to studs 34 that are mounted on arms 35 carried by the rocker. The springs are always under tension to urge the brushes against the commutator bars. Each brush is retracted from the commutator by a slide 36 mounted in the groove 37 of the rocker brush arm 27, this slide having a leaf spring 38 fastened to it in such a manner that the free end is adapted to engage in a notch 39 in the side of the brush. There are a series of notches 39 arranged in line with the direction of movement of the brush so as to form abutments with which the spring 38 can engage as the brush wears away, and preferably these teeth or abutments formed by the recesses 39 may be in both sides of the brush, so that the necessity of making rights and lefts may be avoided. The slide 36 has rack teeth 40 with which meshes a pinion 41 which is journaled in the rocker 23, as shown in Figs. 6 and 7, and meshing with this pinion is a toothed plunger 42 which has spaced shoulders 43 and 44 between which engage an axially moving element connected with the governor, so that as the governor responds to the increase in speed the plungers or brush-retracting members 42 will be moved axially toward the commutator, as shown in Fig. 7, whereby the pinions will operate the slides 37 to retract the brushes. The springs 38 are normally disengaged from the brushes but are tensioned toward them, the disengagement being effected by a stationary wall 45 interposed between the spring and the brush. When the slide 37 moves away from the commutator the spring will engage in the nearest recess in the brush and move the brush with it out of engagement with the commutator. When the speed of the motor diminishes and the armature stops the parts will move in directions opposite from those indicated by the arrows in Fig. 7, so that the brushes will return into contact with the commutator.

The short-circuiting device E is interposed between the brush system D and the commutator C, and it consists of an annular structure slidable axially of the motor shaft. The short-circuiting device comprises an annular carrier or sleeve 46 which has a peripheral flange 47, and surrounding the sleeve is an annular shell 48 which engages the flange 47 and which coöperates with the sleeve 46 to form an annular channel in which are set metal segments 49 that are retained in the channel by a retaining ring 50 which is fastened to the sleeve 46. These segments form a complete circle so as to engage the commutator bars, but the short-circuiting segments 49 have beveled surfaces 51 for engaging the corresponding bevels of the commutator bars. The short-circuiting segments are threaded on wire rings 52 on which the segments have free movement, and furthermore the segments have free movement radially in the channel in which they are disposed. This is advantageous for the reason that, when the short-circuiting device is in open circuit position, centrifugal force may act on the segments 49 so as to throw them outwardly, and as the short circuiting device moves axially under the action of the governor the beveled surfaces, by engaging the beveled inner ends of the commutator bars, will cause the segments 49 to move inwardly so that there will be a sliding contact between the short-circuiting segments and commutator bars, whereby the surfaces will be maintained clean. This short-circuiting device is normally spaced out of engagement with the commutator, as shown in Fig. 13, but when the motor is operating at normal speed it is held in engagement with the commutator by means of a helical compression spring 53 which is placed under tension by the governor F.

The governor or speed responsive device F comprises a pair of weights 54 which, as shown in Fig. 10, are disposed at opposite sides of the shaft G, each weight having an arm 55 extending tangentially to the shaft, and these arms are disposed in recesses 56 in the webs or spokes 57 of the cylinder 5. On the armature and in these weights are pivot pins 58 on which the weights are adapted to swing, the pivot pins being disposed radially so that the weights will swing in planes parallel to a diametrical line passing through the shaft. The arms 55 project beyond the pivots and are connected by pivots 59 with links 60 which extend through the armature and are disposed parallel with the shaft G.

As shown clearly in Figs. 9, 10, 11 and 15 each link at its pivoted end is provided with a projection 61 which extends inwardly toward the adjacent pivot 58 and enters an annular groove 62 in said pivot, so that when the weights are fastened to the links and the weights are assembled on the armature, the pivot pins 58 are retained in place. The pivots 59 are held in place by each having one end formed into a head 63 and by a cotter pin 64 applied to the opposite end. The links 60 have their forward ends enlarged into heads 65 that provide shoulders 66 so that these heads can interlock with a sleeve or guide 67 which is slidable in the cylinder or annular hub 4 at the front end of the armature, such guide 67 having an annular flange 68 which is provided with recesses 69 for receiving the links with their heads 65 disposed in front of the flange 68. As the weights move outwardly from their normal position the links move to the right, Fig. 13, and cause the sleeve 67 to move in the same direction, whereby the short-circuiting device E is engaged with the commutator C, as shown in Fig. 1. This sleeve 67 forms a guide for the governor spring barrel 70 which surrounds the shaft and on which the short-circuiting device slides, and within this barrel 70 and guide 67 is a helical compression spring 71 which operates to oppose the outward or centrifugal movement of the governor weights, the spring having one end bearing against a nut 72 which is screwed into the spring barrel and bears against the armature plate 2, whereby the spring exerts a pull toward the left on the governor and parts connected therewith. At the point of juncture between the barrel 70 and guide 67 is an external annular shoulder 73 which engages the short-circuiting device for moving the same to the left when the speed lowers and the governor weights move inwardly. The spring barrel 70 has an external flange 74 faced with an anti-noise ring 75, and bearing on this ring is the spring 53, which maintains the short-circuiting device against the commutator when the governor weights are in their outward position. An annular guide surrounds that portion of the spring having the flange 74, said guide consisting of a ring 76 into which is screwed a ring 77 which engages the fiber ring 75, and on the ring 76 is an internal flange 78 faced with a fiber ring 79, whereby the flange 75 is prevented from wearing the ring 76. The annular structure formed by the rings 76 and 77 slides axially in the brush rocker 23 as the governor causes the spring barrel to slide.

When the motor is idle the governor weights are indrawn, as shown in Fig. 13, and the short-circuiting device E is in open circuit position, as shown in this figure, while the brushes are in engagement with the commutator, as shown in Fig. 7. When current is supplied to the motor the same operates on the repulsion principle to cause the armature to rotate, and as the speed increases, the governor weights swing outwardly and cause the short circuiting device to engage the commutator, as shown in Fig. 12, where the segments 49 are just making a contact with the commutator bars. The governor weights move still farther until they attain the position shown in Fig. 1, and during this time the spring 53 is placed under tension, so that the short-circuiting segments 49 will be held firmly against the commutator, and during this time the spring is being placed under tension the brushes are disengaged from the commutator. The motor now operates on the induction principle, since the armature has its commutator segments short-circuited.

The bearings H are chambered and receive the ends of the shaft G, and in each bearing is a support 80 that holds an annular bearing bushing 81 that has a recess 82 in its top portion for enabling the oiling ring 83 to bear on the journals or ends 84 of the shaft G. In the top of each bearing housing H is a plugged opening 85 through which lubricant is supplied to the interior of the bearing H, and at the bottom of this bearing is a plugged drain opening 86 in line with the shaft. The wall of the chamber in the bearing is provided with a bearing cap 87. It will be noted that the bearing H is made in one piece, and the method of constructing this bearing with the oiling ring 83 therein consists in arranging the ring in the core used in the operation of casting the bearing H. It will be obvious that the usual large opening in the top of the bearing for the insertion of the oiling ring is dispensed with, so that there is no danger of lubricant being splashed out, as is at present a common objection.

From the foregoing description taken in connection with the accompanying drawings, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as fall within the scope of the appended claims.

Having thus described my invention, I claim as new and desire to secure by Letters Patent:

1. In an electric motor, the combination of an armature commutator, a short-circuiting device movable into and out of engagement with the commutator, a speed responsive device, and a yielding means between the two devices whereby the speed responsive device acts through the yielding means to maintain the short-circuiting device in engagement with the commutator at normal speed.

2. In an electric motor, the combination of an armature, a commutator therefor, a short-circuiting device including loosely mounted segments adapted to engage the bars of the commutator, means for moving the short-circuiting device into and out of engagement with the commutator, and a yielding element interposed between the said means and device whereby the latter is maintained in intimate contact with the commutator at normal speed.

3. In an electric motor, the combination of an armature, a commutator therefor having the contacting faces in a plane transverse to the axis of rotation, an axially movable supporting element, a short-circuiting device movable longitudinally of the element to engage and disengage the commutator, a spring interposed between the said device and element for urging the device against the commutator, and a speed responsive device connected with the said element for moving the same to throw the short-circuiting device into and out of engagement with the commutator.

4. In an electric motor, the combination of a commutator comprising a circle of radial bars having their inner ends beveled, with a short-circuiting device having loosely mounted segments provided with beveled surfaces to engage and disengage the beveled ends of the bars.

5. In an electric motor, the combination of a commutator comprising a circle of radial bars having their inner ends beveled, with a short-circuiting device having loosely mounted segments provided with beveled surfaces to engage and disengage the beveled ends of the bars, and a wire passing through the segments and permitting the latter to move outwardly under centrifugal force and move inwardly by the wedging action incident to the beveled surfaces of the segments engaging the beveled ends of the commutator bars as the said device short-circuits the commutator.

6. In an electric motor, the combination of a commutator comprising a circle of radial bars having their inner ends beveled, with a short-circuiting device having loosely mounted segments provided with beveled surfaces to engage and disengage the beveled ends of the bars, a wire passing through the segments and permitting the latter to move outwardly under centrifugal force and move inwardly by the wedging action incident to the beveled surfaces of the segments engaging the beveled ends of the commutator bars as the said device short-circuits the commutator, a channeled carrier in which the segments are loosely mounted, a yielding element, and a speed responsive device acting through the element on the carrier to maintain the segments of the device firmly against the commutator at normal speed.

7. In an electric motor, the combination of an armature commutator, brushes adapted to engage the commutator at low speed, a device adapted to short-circuit the commutator at high speed, a speed responsive device for moving the brushes axially away from the commutator and the short-circuiting device axially toward the commutator, and a spring interposed between the short-circuiting and speed responsive devices, whereby the latter maintains the spring under tension while the former is engaged with the commutator.

8. In an electric motor, the combination of a motor armature, a commutator, brushes normally engaging the same, a short-circuiting device normally disengaging the commutator, a speed responsive device, a spring interposed between the two devices, whereby the speed responsive device acts through the spring to engage the short-circuiting device with the commutator, and means through which the brushes are disengaged from the commutator by the movement of the speed responsive device after the short-circuiting device engages the commutator and while the spring is being placed under tension by the speed responsive device.

9. In an electric motor of the class described, the combination of an armature, a speed responsive device connected therewith, brushes for the commutator, a slidable element operatively connected with the speed responsive device, and a member normally disengaged from the brush and movable by the element to engage the brush and remove the same from the commutator.

10. In an electric motor of the class described, the combination of a commutator, a brush engaging the same and movable into and out of engagement with the commutator in a direction parallel with the axis of rotation, a speed responsive device including an element movable axially of the commutator, a toothed member connected with the element to move therewith, a pinion engaging the member, a rack engaging the pinion, a spring carried by the rack, and means on the brush normally disengaged from the spring and adapted to be engaged by the latter as the speed responsive device becomes active for removing the brush from the commutator.

11. In an electric motor, the combination of an armature, a centrifugally acting weight, a pivot extending transverse to the axis of the armature and connecting the weights with the latter, a link pivotally connected with the weights, and means carried by the link to form a key to hold the pivot in place.

12. In an electric motor, the combination of an armature, a centrifugally acting weight, a pivot connecting the weight with the armature in a line passing transversely through the axis of rotation, an arm on the weight, a link connected with the arm, said pivot having an annular groove, and a member on the link extending into the groove for preventing axial movement of the pivot.

In testimony whereof I have signed my name to this specification in the presence of two subscribing witnesses.

HARRY WALLACE JEANNIN.

Witnesses:
G. B. SAWYER,
W. C. WARD.